(12) United States Patent
Fenn et al.

(10) Patent No.: US 6,540,052 B2
(45) Date of Patent: Apr. 1, 2003

(54) DAMPING VALVE, IN PARTICULAR FOR A VIBRATION DAMPER

(75) Inventors: Gerald Fenn, Pfersdorf (DE); Hassan Asadi, Schweinfurt (DE); Matthias Höhn, Albertshofen (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/776,828

(22) Filed: Feb. 5, 2001

(65) Prior Publication Data

US 2001/0023801 A1 Sep. 27, 2001

(30) Foreign Application Priority Data

Feb. 5, 2000 (DE) .......................... 100 05 180

(51) Int. Cl.⁷ .................................. F16F 9/34
(52) U.S. Cl. ............................. 188/322.15; 188/322.22; 188/282.5
(58) Field of Search ............... 188/322.15, 322.22, 188/282.5, 282.6, 316, 317, 271; 92/183, 184; 137/493.8, 493.9; 267/124

(56) References Cited

U.S. PATENT DOCUMENTS

| 4,830,152 A | 5/1989 | Rauert et al. ......... 188/322.15 |
| 5,595,269 A | * 1/1997 | Beck .................... 188/322.15 |
| 5,615,756 A | 4/1997 | Grundei et al. ........ 188/322.15 |
| 6,018,868 A | 2/2000 | Asadi et al. .............. 29/888.04 |
| 6,129,005 A | 10/2000 | Asadi et al. ................... 92/183 |

FOREIGN PATENT DOCUMENTS

| DE | 3701557 | * | 8/1988 |
| DE | 91 03 740 | | 8/1991 |
| DE | 19037400.9 | | 8/1991 |
| DE | 40 24 789 | | 12/1991 |
| DE | 4024789 C1 | | 12/1991 |
| DE | 4033410 A1 | | 4/1992 |
| DE | 40 33 410 | | 4/1992 |
| DE | 4410996 C1 | | 6/1995 |
| DE | 19752670 A1 | | 6/1999 |
| DE | 199 23 927 | | 1/2001 |
| DE | 10005180 | * | 8/2001 |

OTHER PUBLICATIONS

Translation of Adverse Decision rondered by German Patent Office in 100 05 180 on Oct. 12, 2000.*

* cited by examiner

Primary Examiner—Douglas C. Butler
(74) Attorney, Agent, or Firm—Cohen, Pontani, Lieberman & Pavane

(57) ABSTRACT

Damping-valve body, in particular for a piston-cylinder unit filled with damping fluid, having separate passages for two directions of flow, at least some of the passages having an outlet opening that is at least partially covered by at least one valve disk. Each passage has a rib that extends radially, relative to a first direction of flow of the damping fluid, from a boundary wall of the passage and bears a valve support surface for the at least one valve disk.

9 Claims, 4 Drawing Sheets

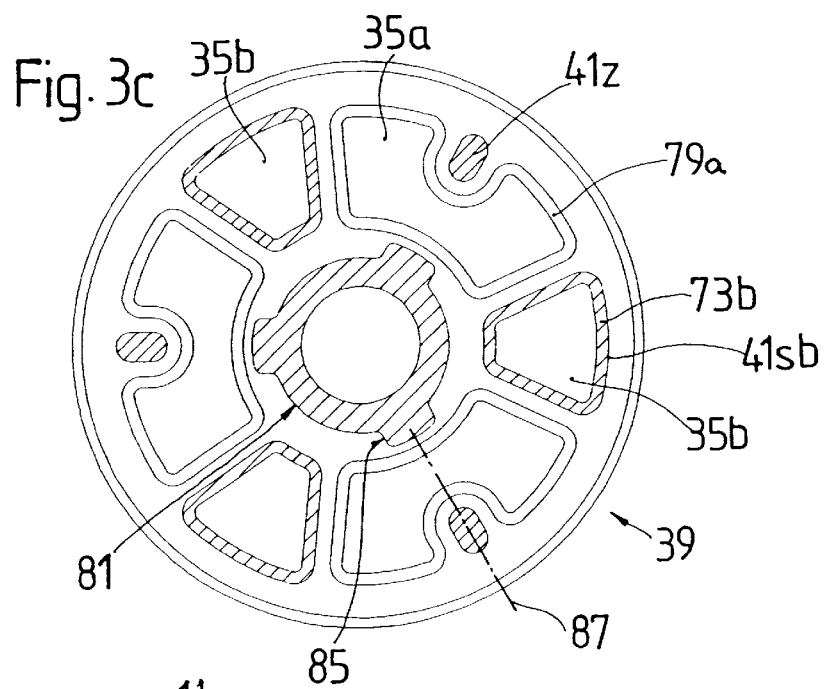
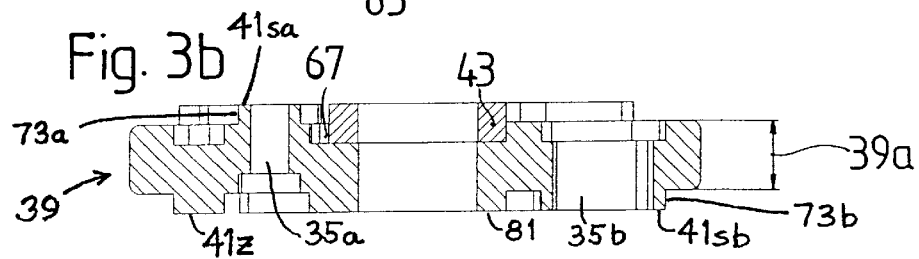
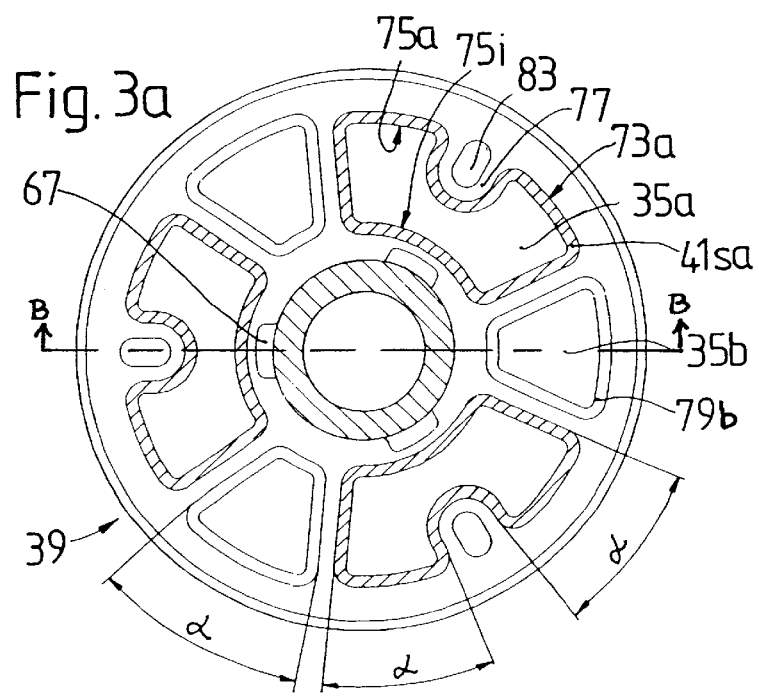

DAMPING VALVE, IN PARTICULAR FOR A VIBRATION DAMPER

BACKGROUND OF THE INVENTION

1. Field of the Invention

The invention relates to a damping valve body of the type having an axis, a circumference, first passages for flow in a first axial direction, and second passages for flow in a second axial direction, each passage having a boundary wall extending between an inlet opening and an outlet opening, at least some of said outlet openings being covered by a valve disk.

2. Description of the Related Art

U.S. Pat. No. 4,830,152 discloses a damping valve in the form of a piston damping valve having passages for a damping fluid, at least some of the passages having a circumferentially extending outlet opening that is at least partially covered by at least one valve disk. The significant advantage of circumferentially extending passages or at least outlet openings is that a larger outlet cross section can be achieved and this, in turn, gives the damping valve a somewhat degressive damping-force characteristic. The piston damping valve in U.S. Pat. No. 4,830,152 is composed of a sintered material and can therefore be designed with considerably more freedom than a damping valve that is formed in a disk shape, in one piece and by stamping, where, starting from a damping-valve main body, those areas of the damping-valve body which are raised on one side of the damping valve are in the form of depressions on the axially opposite side of the damping valve. Damping valves constructed in this way have been disclosed in U.S. Pat. Nos. 5,615,756, 6,018,868, and 6,129,005, for example, and have a plurality of passages with a circular cross section. Overall, the sum of the cross-sectional areas of the outlet openings is significantly less than with a damping valve corresponding to U.S. Pat. No. 4,830,152. It is not possible simply to transfer the configuration of the passages to a damping valve produced by means of stamping since there is a limit to the forming that can be performed by stamping and, for example, the annular chamber illustrated in FIG. 1 can be formed only with difficulty in a stamped damping valve.

SUMMARY OF THE INVENTION

It is the object of the present invention to obtain a damping valve that allows a degressive damping-force characteristic at a low overall damping-force level.

According to the invention, the object is achieved by virtue of the fact that the circumferentially extending outlet opening has a rib that extends radially, relative to a first direction of flow of the damping fluid, from a boundary wall of the outlet opening and bears a valve support surface for the at least one valve disk.

The circumferentially extending outlet opening allows better use of the damping valve's area as regards maximization of the area subjected to pressure on the valve disks used. The larger the outlet openings can be made, the more degressive the damping-force characteristic can be made and the lower the damping-force level that can be achieved. If the intention is to make the damping-force characteristic less degressive or to achieve higher damping-force levels, it is possible to use thicker valve disks, which have a higher fatigue strength.

In a further advantageous refinement, the rib is designed as a rib extension. Two advantages are achieved by means of this measure. On the one hand, it results in a weaker restriction effect in the passage and, in addition, a particularly light damping-valve body is obtained.

In order to achieve as uniform as possible a distribution of the areas of support for the valve disks, the rib is embodied so as to extend radially inward from an outer boundary wall of the outlet opening. The rib can also be made to extend radially outward from an inner boundary wall of the outlet opening but production of such a rib arrangement in conjunction with trapezoidal outlet openings is less advantageous since the lateral clearance for a tool between the rib and the lateral end points of the inner boundary wall should be as large as possible.

In order to come even closer to achieving as uniform as possible distribution of the area of support, provision is made for at least one valve support surface to be arranged radially relative to an area in which the circumferentially extending outlet openings are formed, this valve support surface being arranged on a radial reference line that coincides with the rib.

Production of the damping-valve body is particularly simple if the outlet opening in the damping-valve body has the same cross section as an inlet opening of the same passage.

Thus, there is provision for the damping-valve body to be formed in a disk shape, in one piece and by stamping, and, starting from a damping-valve main body, those areas of the damping-valve body which are raised on one side of the damping valve are in the form of depressions on the axially opposite side of the damping valve. Essentially perpendicular punched and stamped surfaces are advantageous, particularly in this production process.

Particularly good support for the valve disk can be achieved if the outlet opening is framed by a valve support surface embodied as an encircling ridge.

In order to maximize the effective area subjected to pressure on the valve disk as far as possible, provision is made for the encircling ridge of the outlet opening for the first direction of flow to extend radially outside the area of the main body of the damping valve that bears the valve support surface for the valve disk of the second direction of flow on the rear side of the rib.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3a is a top view of the valve body;

FIG. 3b is a section view of the valve body taken along line B—B of FIG. 3a;

FIG. 3c is a bottom view of the valve body; and

DETAILED DESCRIPTION OF THE PRESENTLY PREFERRED EMBODIMENTS

Figure 1:
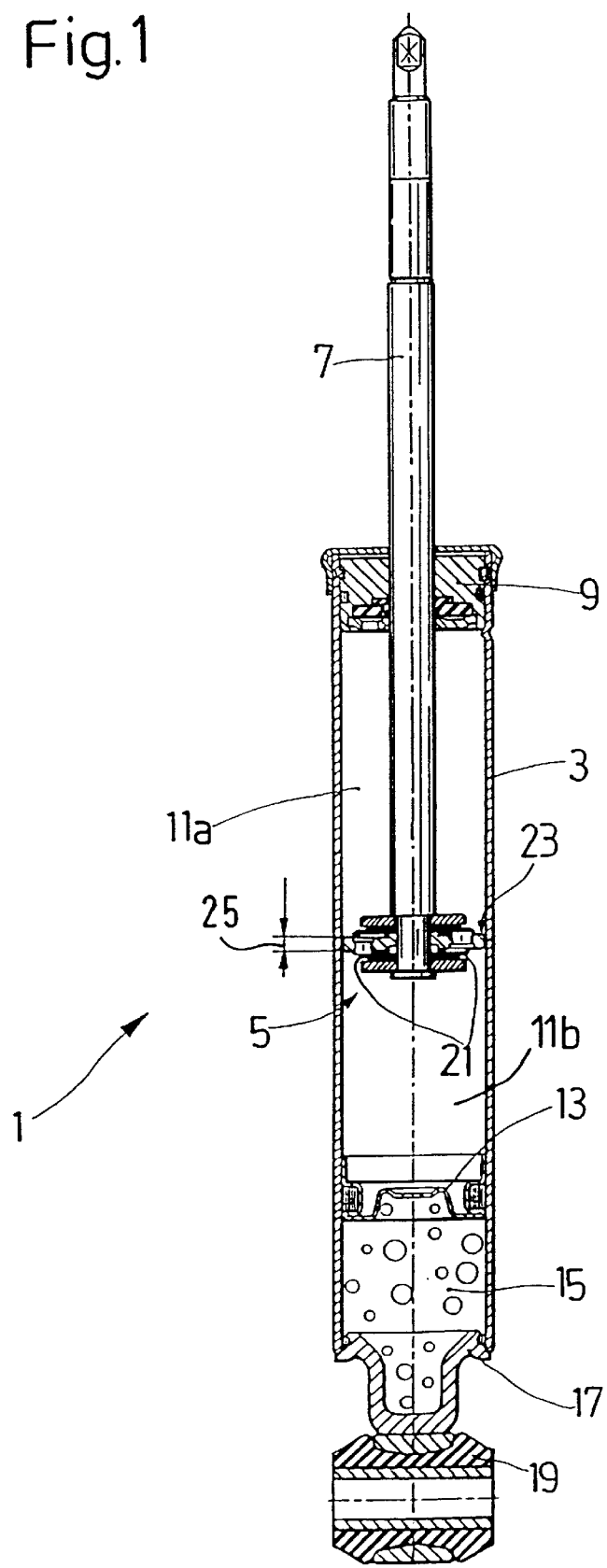
FIG. 1 is a cross-section of a piston-cylinder unit.

FIG. 1 shows by way of example a piston-cylinder unit 1 embodied as a single-tube vibration damper. In principle, the invention can also be used with other piston-cylinder units, e.g. gas-filled springs or the like.

The single-tube vibration damper 1 essentially comprises a pressure tube 3, in which a piston 5 is arranged in an axially movable manner on a piston rod 7. At the outlet end of the piston rod 7 a piston-rod guide 9 closes off a working space 11, which is filled with damping fluid and is separated by a separating piston 13 from a gas space 15 that has a bottom 17 with a lug 19 at the end.

When the piston rod moves, damping fluid is displaced through damping valves 21 in the piston 5. A piston ring 23, which covers a circumferential surface 25 of the piston 5, prevents fluid from flowing around the side of the piston.

Figure 2:
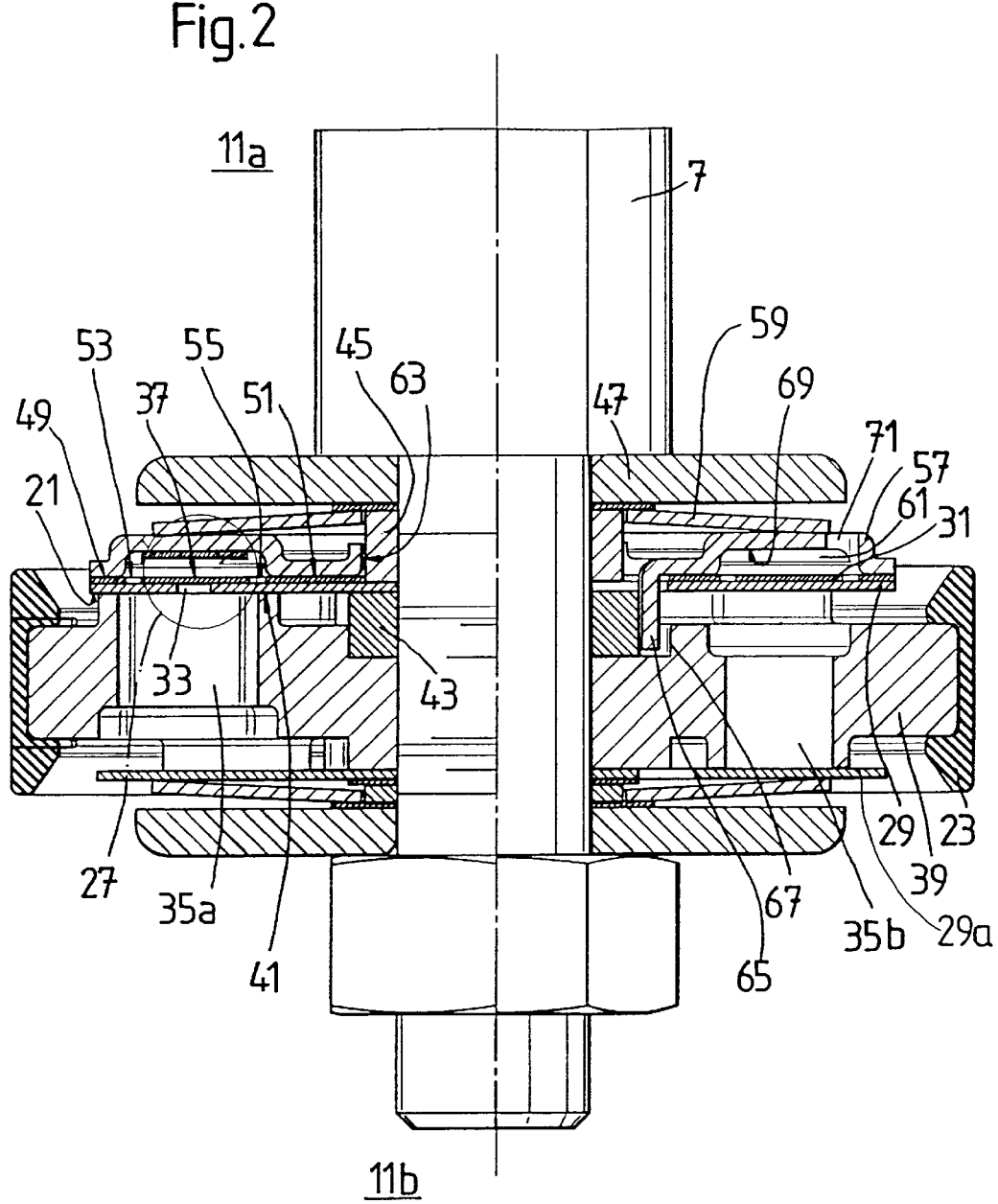
FIG. 2 is a section of a damping valve as a piston in section.

FIG. 2 shows the piston 5 as a damping valve with a changeover valve 27, which, in this embodiment, comprises a restrictor disk 29 combined with a changeover disk 31. The changeover disk contains at least one restrictor cross section 33 oriented toward a first passage 35a, the restrictor cross section(s) being covered by a covering surface 37 of the changeover disk 31. In principle, the invention can also be applied to a bottom valve of a vibration damper or some other application.

The changeover valve 27 is part of the damping valve 21 in the piston 5 of the vibration damper, which has a damping-valve body 39 that connects the two working spaces 11a and 11b by means of the first and second passages 35a, 35b, each of which is used for a different direction of flow. The passages end at valve support surfaces 41, on which the outer area of the restrictor disk 29 rests. A support ring 43 is placed in or pressed into the damping-valve body in the radially inner area, its support surface lying precisely in one plane with the valve support surfaces 41, with the result that the restrictor disk is flat over its entire surface. The restrictor disk is centered by means of its inside diameter on a journal of the piston rod 7. If appropriate, the support ring 43 is machined to the intended height in a joint operation with the valve support surface 41 (see FIGS. 3 and 4). The restrictor disk is capable of elastic deformation, the outer area, which rests on the valve support surfaces 41, being capable of lifting off, while the inner area is fixed at the piston-rod journal by means of a clamping ring 45 in conjunction with a stop disk 47.

Radially inside and outside the covering surface 37, the changeover disk 31 resting on the restrictor disk 29 has inner and outer clamping surfaces 49, 51, which are each separated by suitable recesses 53, 55, allowing the covering surface 37 to lift off resiliently from the valve support surface 41 in the axial direction of the valve body. The spring tongues of the changeover disk ensure reliable closure of the restrictor cross sections 33 when the direction of motion is reversed. To center the changeover disk 31, use is made of its inside diameter, which likewise engages on the clamping ring. As regards the specific design of the changeover disk, attention is drawn to U.S. Pat. No. 6,336,536, which is incorporated herein by reference.

To ensure that the lift-off movement of the covering surface 37 of the changeover disk 31 is limited, a retaining disk 57 is placed on the clamping surfaces 49, 51 and this in turn is preloaded by a spring element 59, in this case a Belleville spring. At least in the area of the covering surface 37 of the changeover disk 31, the retaining disk 57 has a channel 61 that provides the necessary clearance for the lift-off movement of the covering surface 37 (left-hand half of the section). Guide segments 63 are formed as radial guides at the inside diameter of the retaining disk 57 in the direction of the stop disk 47. In the other direction there are locking segments 65, which pass through the changeover disk 31 and the restrictor disk 29 and into a mating profile 67 of valve body 3a that matches the locking segments 65.

Machined into the base 69 of the channel 61 are flow connections 71 that connect the channel to the upper working space 11a, the flow connections lying outside the area of the spring element 59.

When damping fluid flows to the changeover valve 27 from the working space 11b through the first passages 35a, which may also be referred to as the first direction of flow, the restrictor disk 29 is pressed onto the cross section of the passages. Low pressures cannot cause the restrictor disk to lift off from the valve support surfaces 41 against the force of the spring element 59. In these cases, only the covering surface 37 of the changeover disk 31, which is subjected to load on the cross section of the pre-openings 33, is lifted off from the restrictor disk 29 against a very small spring force, allowing damping fluid to flow into the channel 61 and on through the flow connections 71 into the working space 11a.

If somewhat higher pressures occur, the restrictor disk 29 also lifts off the support surfaces 41, bringing the damping valve 21 into action. The changeover disk 31 and the retaining disk 57 are likewise raised. If the direction of flow is reversed, a direction which may also be regarded as the second direction of flow, the covering surface 37 is pressed onto the restrictor disk 29 by the spring action of the changeover disk 31 and by the pressure in the channel 61, with the result that the damping fluid can flow into the working space 11b only through the passages 35b.

Flow through the passage 35b is possible only when the fluid pressure is high enough to lift the restrictor disk 29a off of the support surfaces surrounding the passages 35b.

The fitting of the piston 7 with a changeover disk 31 should be regarded as illustrative. For different requirements, it is also possible to dispense with a changeover disk and to employ single valve disks or a plurality of valve disks with any desired spring rate on both sides of the piston.

FIGS. 3a to 3c show the damping-valve body 39 separately. The damping-valve body has a damping-valve main body 39a, which has depressions on one side that form a raised valve support surface on the reverse as a product of stamping. The passages 35a, 35b in the damping-valve body 39 or more specifically their outlet openings are framed by respective ridges 73a, 73b. Radially on the inside and radially on the outside, the outlet opening has a boundary wall 75a, 75i. Starting from the boundary wall 75a extending radially on the outside, the piston's main body 39 has a radially inward-pointing rib 77. As can be seen from FIG. 3a, the ridge 73a extends along the boundary edge of the rib and is embodied merely as an extension of the rib. The ridge 73a forms a valve support surface 41sa for at least one valve disk 29 (see FIG. 2). The ridges 73a (FIG. 3a) are visible as insets 79a (FIG. 3b) on the bottom of the piston's main body 39a.

The valve support surfaces 41sa for the valve disks 29 for flow through the damping valve in the direction of compression as the piston rod retracts into the cylinder are shown hatched. As can be seen, the circumferentially extending portions of the ridge 73a on the outside are approximately the same size (subtending angle a) as the ridge 73b forming the valve support surface 41sb at the outlet opening 35b for the other direction of flow. The ridge portion on the radial rib 77 is intended to prevent the valve disk 29 from being deformed into the passage 35a by the dynamic pressure on its upper side as the piston rod extends out of the cylinder.

FIG. 3b is a cross-section of the damping valve body 39 showing the support surfaces 41sa, as well as the support surfaces provided by ring 43, on top of the body 39a, and the support surfaces 41sb, 41z, and 81 on the bottom of the body 39a.

In FIG. 3c, a support surface 81 is raised, this surface corresponding to the volume for the recessing of the pressed-in support ring 43 plus the mating profile 67. For the valve disk 29a (see FIG. 2), the outlet opening of the passage 35b is likewise framed by a ridge 73b, which forms a valve support surface 41sb. Also available is a stud-like valve support surface 41z, which is arranged on the radially inward-pointing rib 77. The volume of material for the stud-like valve support surface 41z is formed by a stamped feature 83 in the form of a blind hole, which can be seen in FIG. 3a. The stud-like valve support surface 41z is aligned in such a way relative to the inner support surface 81 that a projection 85, corresponding to the volume accounted for by the mating profile 67, and the stud-like valve support surface 81 are on a common radial reference line 87. The encircling ridge 73b of the passage 35b and the stud-like support surface 41z support the valve disk 29a uniformly and prevent the valve disk 29a from being deformed into the passages 35a when the damping fluid flows in from the working space 11b. The ridges 73b (FIG. 3c) are visible as insets 79b (FIG. 3a) on the top of the piston's main body.

Figure 4C:
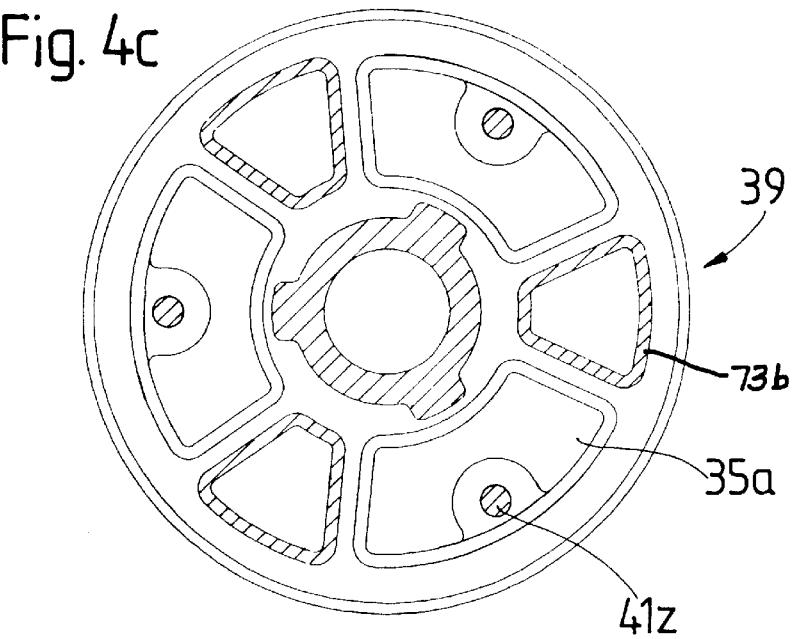
FIGS. 4a, 4b and 4c show a modification of the piston illustrated in FIGS. 3a–3c.
Figure 4B:
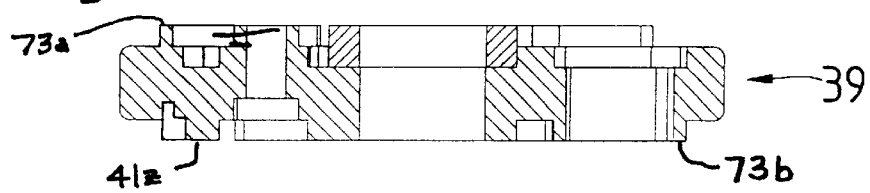
Figure 4A:
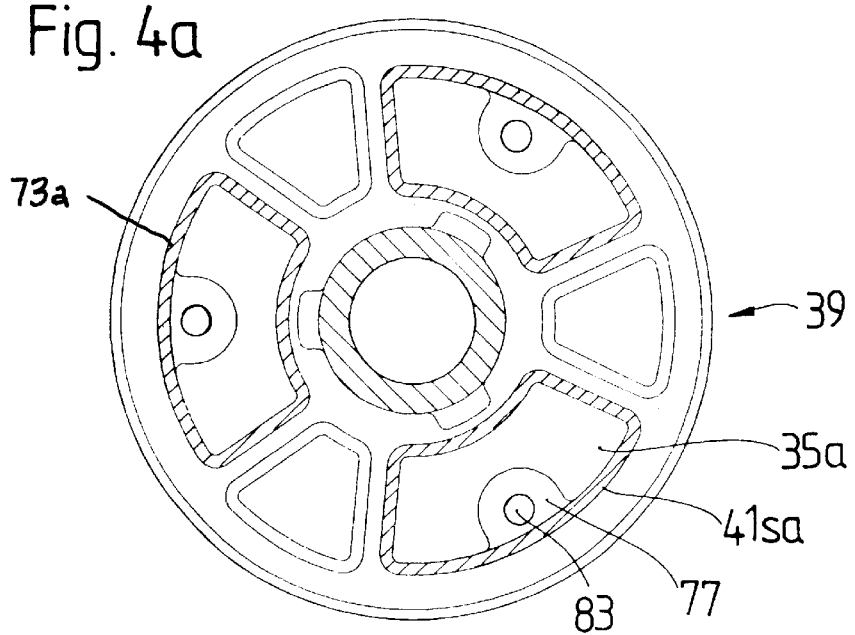

The exemplary embodiment of the damping-valve body 39 shown in FIGS. 4a to 4c differs from the version shown in FIGS. 3a to 3c in that the encircling ridge 73a of the outlet opening for the passage 35a extends radially outside that part of the rib 77 which bears the stud-like valve support surface 41z on the rear side of the rib 77. To provide a better comparison, a through-opening is in each case drawn in with the new feature. The other through-openings correspond to the configuration shown in FIGS. 3a to 3c. The cross-sectional area subjected to pressure should be regarded as the passage plus the area of the rib, a more pronounced degressive characteristic and, overall, a reduction in the damping force of the damping valve when the damping fluid is flowing from working space 11b into working space 11a thereby being obtained.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A damping valve body for a piston-cylinder unit filled with a damping fluid, said damping valve body comprising an axis, a circumference, first passages for flow in a first axial direction, second passages for flow in a second axial direction which is opposite to said first axial direction, each passage having an inlet opening, an outlet opening, and a boundary wall extending between said inlet opening and said outlet opening, each said outlet opening being framed by a respective encircling ridge which serves as a valve support surface for at least one valve disk, each said boundary wall of each said first passage having a radially extending rib bearing a respective valve support surface for at least valve one disk located over said inlet opening of the respective said first passage, said encircling ridge framing said outlet opening of each said first passage extending radially outside said valve support surface over said inlet opening of said first passage.

2. A damping valve body as in claim 1 wherein each said boundary wall comprises a radial inner boundary wall and a radial outer boundary wall, each said rib extending radially inward from a respective said outer boundary wall of a respective said first passage.

3. A damping valve body as in claim 1 wherein each said rib is axially extended to form part of said encircling ridge framing said outlet opening of a respective one of said first passages, each said valve support surface for at least one valve disk located over said inlet opening of each said first passage lying outside an area of said valve body bearing said encircling ridge framing said outlet opening of said first passage.

4. A damping valve body as in claim 1 wherein each said valve support surface for at least one valve disk located over said inlet opening of each said first passage lies inside of said encircling ridge framing said outlet opening of said first passage.

5. A damping valve body as in claim 1 further comprising additional support surfaces arranged between said first passages and said axis, each said additional support surface being radially aligned with a respective said rib.

6. A damping valve body as in claim 1 wherein, for each said passage, said inlet opening and said outlet opening have at least substantially the same cross-section.

7. A damping valve body as in claim 1 wherein said valve body is formed in one piece, said body having axially opposed sides with raised portions on one side being axially opposed from depressions on the other side.

8. A damping valve body as in claim 1 wherein the cross-sectional area of each said first passage is substantially larger than the cross-sectional area of each said second passage.

9. A damping valve body as in claim 1 wherein said first passages alternate circumferentially with said second passages.

* * * * *